United States Patent Office 3,377,376
Patented Apr. 9, 1968

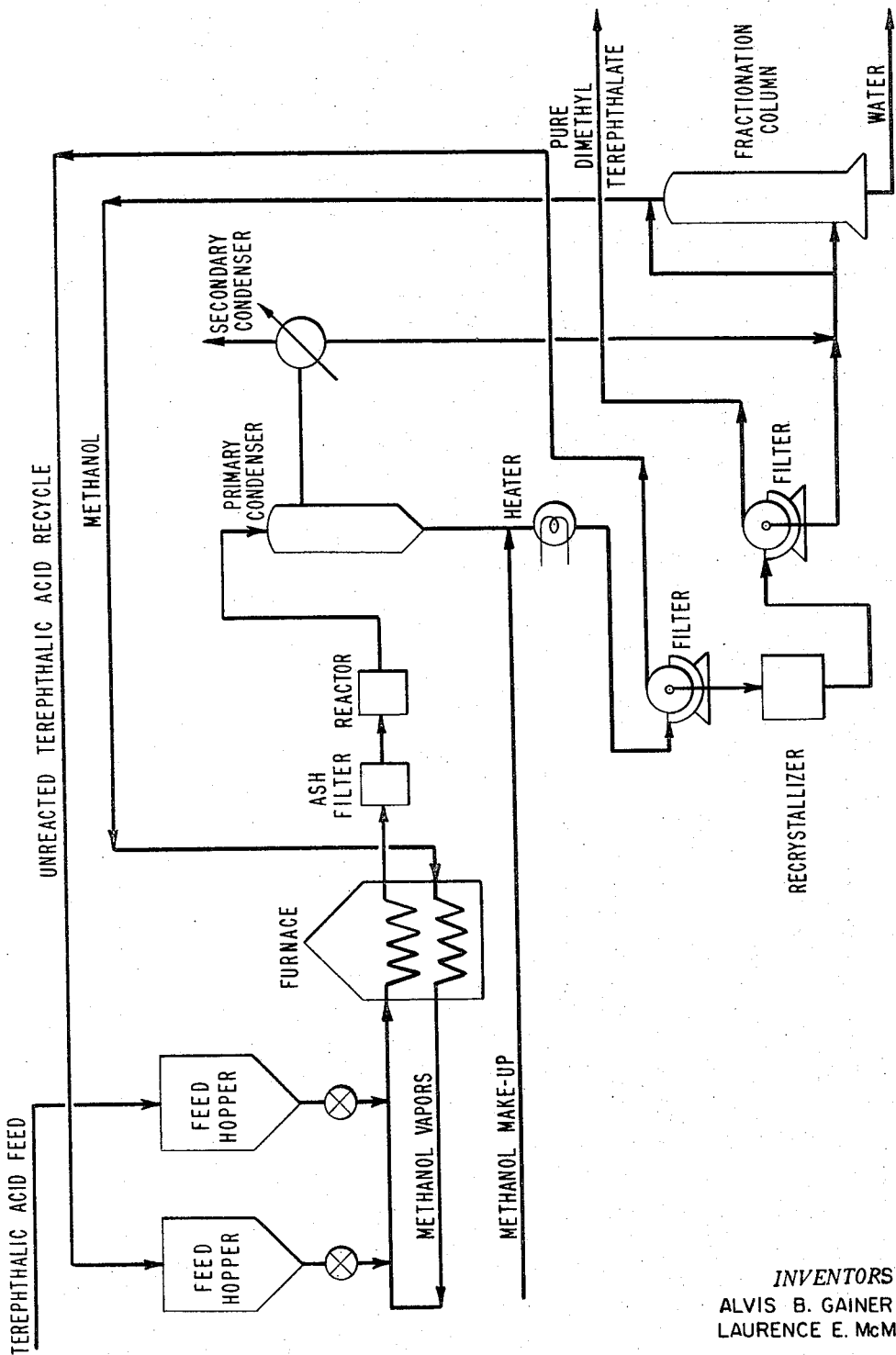

3,377,376
VAPOR PHASE ESTERIFICATION OF TEREPH-
THALIC ACID IN THE PRESENCE OF AL-
KALI METAL IMPREGNATED CATALYST
Alvis B. Gainer and Laurence E. McMakin, Beaumont,
Tex., assignors to Mobil Oil Corporation, a corpora-
tion of New York
Filed Feb. 7, 1966, Ser. No. 525,420
10 Claims. (Cl. 260—475)

This invention relates to a method for the preparation of esters of aromatic dicarboxylic acids and their anhydrides and, more specifically, esters of terephthalic acid, by esterification of the acids with alcohols and, particularly, with lower aliphatic alcohols as the monohydric alcohols of the methanol series containing one to four carbon atoms and lower molecular weight glycols, such as ethylene glycol to prepare for example, products such as bis-(beta-hydroxyethyl)terephthalate.

Esters of aromatic dicarboxylic acids are of interest because of their use in the manufacture of various polyesters and, of such esters, those of terephthalic acid are of great interest for that purpose. Thus, and using esters of terephthalic acid for purposes of discussion, fiber- and film-forming polyalkylene terephthalates can be prepared from the acid via its alkanol diesters. For use in such a process, the acid should possess an extremely high degree of purity, and the terephthalic acid may be purified as such and also indirectly by purification of its dialkyl ester. The desired polyalkylene terephthalate is then prepared by an ester interchange reaction between the dialkyl ester and an appropriate alkylene glycol.

Terephthalate acid can be manufactured by, for example, the catalytic oxidation of p-xylene according to the method of U.S. Patents 2,853,514 and 3,036,122. In such cobalt-catalyzed oxidation processes, the p-xylene is utilized in the form of a dilute solution (about 2 to 20%, preferably 7 to 12%) in a solvent comprising acetic, propionic or butyric acids or a mixture of such acids. The effective catalyst is a soluble cobalt salt, in the form of a cobalt acetate, propionate or butyrate or mixtures thereof in such amounts as to correspond to 0.1 to 1.0%, preferably 0.3 to 0.6%, by weight of cobalt metal based on the weight of fatty acid solvent. As a reaction activator, a methylenic ketone such as methyl ethyl ketone, methyl propyl ketone, diethyl ketone, 2,4-pentanedione and 2,5-hexanedione is used with methyl ethyl ketone being preferred. Concentrations of the activator is generally at least 1%, and preferably in the range of 3 to 10% by weight of the fatty acid solvent. For efficient oxidation, between 1 and 9% of water is present in the reaction mixture with best results being obtained when the water content is in the range of 3 to 7%.

Oxidation is effected by contacting the reaction mixture with a gas containing molecular oxygen. The reaction is allowed to proceed generally for only a few minutes, and at most for not more than about an hour or two, and preferably terminated before all of the methyl groups of the p-xylene have been oxidized. This results not only in the efficient and rapid oxidation of the p-xylene to terephthalic acid, but also in preserving a substantial portion of the ketone activator in the reaction mixture which, after suitable treatment, can be recycled to the oxidation reaction. The resulting terephthalic acid is an insoluble solid and is separated by filtration, centrifugation or other conventional means.

Many of the impurities present in terephthalic acid, including that prepared by catalytic oxidation of p-xylene, are by-products of incomplete oxidation or result from the metal-containing catalyst. Some of these may act as chain terminators during polyesterification and/or give rise to undesirable colors in the resultant polyester product. An adequate purification procedure is required to keep these impurities at acceptable levels.

The esterification of the terephthalic acid with, for example, alcohols such as ethylene glycol or methanol is complicated by its poor solubility in these and other solvents and by its high melting point. Good contact between the reactants is generally not obtained using conventional procedures and the rate of esterification is comparatively slow.

As is well known, the esterification reaction is an equilibrium reaction promoted by the presence of an excess of the alcohol and by the removal of the water of esterification as it is formed. Esterification has been carried out with excess methanol at elevated temperatures using pressure to maintain the methanol in the liquid phase. Terephthalic acid has also been esterified with gaseous methanol.

In general, an acidic catalyst is employed to accelerate the esterification reaction as is heating of the reaction mixture. Strong acid catalysts, especially when used at higher temperatures, tend to promote undesirable color-yielding byproducts as well as ether formation. Such impurities cause serious problems in the further processing and purification of the ester product.

Certain solids, not generally considered as being strongly acidic in nature, such as alumina, silica, silica-alumina, titania, zirconia, thoria, boron phosphate, metal phosphates and the like, are known to be effective as esterification catalysts. However, such solids, when used as esterification catalysts at elevated temperatures, exhibit the undesirable side reactions characteristic of the use of a strong acid catalyst.

The use of such solids as catalysts, for example in the vapor phase esterification of terephthalic acid with methanol, results in 20 to 40% of the methanol feed being converted to dimethyl ether. This ether decomposes at temperatures around 650° F. to form formaldehyde and methane as further reaction by-products. Under esterification conditions, these by-products form coke and otherwise adversely affect the life and the activity of the catalyst. The presence of large amounts of dimethyl ether is particularly undesirable in a system wherein the gaseous methanol stream is to be recycled.

It is an object of the present invention to provide an improved method for esterification of aromatic dicarboxylic acids with alcohols; and, particularly, to provide an improved method for extremely rapid esterification of such acids without need of use of pressure equipment while producing the desired ester in high yield with minimization of by-product ether formation. A specific object is the provision of an improved process for extremely rapid esterification of terephthalic acid with methanol to prepare dimethylterepthalate in high yields with minimized formation of dimethyl ether.

The present invention is based on the discovery that the foregoing and other desirable objectives may be achieved by a vapor phase reaction between the aromatic dicarboxylic acid and the alcohol under certain specified conditions; and, in the use of sublimable acids such as terephthalic acid, the acid is preferably initially purified by being sublimed to free it from its more volatile impurities and filtered to remove metals, ash and other non-solid non-vaporizable impurities. More specifically, the present invention is based on the discovery of a process which, using for illustration the preparation of dimethyl terephthalate, includes contacting a vapor mixture of terephthalic acid and the alcohol reactant with an improved solid esterification catalyst, the nature of which will be described below, for a period of time within the range of about 0.1 to about 25 seconds at a temperature that is below that at which substantial decomposition of the reactants and desired reaction product (e.g., the dimethyl terephthalate) occurs and sufficiently high to effect esterification reaction while maintaining the reactants and desired reaction product in vapor phase. Still more specifically, the process embodied herein is carried out at substantially atmospheric pressure which, for purposes herein, is intended to include some variance and, for example, from somewhat below atmospheric pressure up to about 25 p.s.i.g. Still more specific embodiments include the steps of preparing the vaporous mixture to be esterified by adding the acid (e.g., solid terephthalic acid) to a stream of vaporized alcohol (e.g., methanol) and effecting vaporization of the acid while conveyed by the vapor stream of the alcohol, separating unvaporized solid impurities, and then contacting the thus-purified vapor mixture of acid and alcohol with the esterification catalyst under the aforedefined conditions, followed by cooling the resulting vapor stream carrying the esterified acid to recover the esterified acid.

The process of the present invention is based on the discovery of a method of treating the solid esterification catalyst so as to minimize the formation of ethers and other undesirable by-products during the course of the esterification reaction. Prior to use in the process of the present invention, the solid catalysts are treated or impregnated with aqueous solutions of alkali metal bases or salts so as to contain at least 0.2% by weight of alkali metal oxide impregnated therein. The treated or impregnated catalysts are then dried and calcined to remove excess adsorbed water.

Representative solid esterification catalysts for use in the process of the present invention are true oxides of aluminum, titanium, silicon, zirconia, thorium and the like, boron phosphate, aluminum phosphate, and other metal phosphates, mixtures of such catalysts and the like. Alumina and aluminum orthophosphate are the preferred catalysts.

The alkali metal treating or impregnating solution is an aqueous solution of an alkali metal hydroxide, carbonate, halide phosphate and the like. Superior results are obtained when solutions of sodium or potassium hydroxide are employed for this purpose. The presence in the treating solution of iron, copper, vanadium and other metals which promote dehydrogenation reactions, should be avoided. Ammonium salts are essentially inoperative as treating agents.

In a typical procedure for the preparation of impregnated catalysts, alumina or aluminum phosphate was calcined at about 925° F. for about 8–10 hours, cooled, and washed twice with 1% aqueous solutions of aqueous potassium or sodium hydroxide. About a liter of treating solution was used in washing a 660 gram catalyst sample. The impregnated catalysts were calcined for about 8 hours at about 750° F. in air or for about 4 hours at about 1100° F. in a nitrogen atmosphere.

The presence of significant amounts of water in the catalyst acts as a catalyst poison. At least 4 hours at temperatures in the range of 750–1300° F. are required to remove the adsorbed water. Calcination temperatures above about 1650° F., particularly with alumina catalysts, are to be avoided because of undesirable changes in the surface of the catalyst. The treated and calcined catalyst should have a surface area of at least 100–300 square meters per gram to insure high catalyst activity and long catalyst life.

As stated previously, the treated catalyst should be impregnated to contain at least 0.2%, and preferably 0.2–2.0%, alkali metal as its oxide. Generally speaking, the presence of less than 0.2% of alkali metal in the catalyst is substantially ineffective in reducing the amount of ether by-product formation during esterification as compared to the untreated catalyst. On the other hand, the presence of more than 2% of alkali metal, while not deleterious, will not materially further reduce the amount of by-product ether formation. The presence of about 0.8–1.0% of alkali metal in the catalyst keeps ether formation below about 5% based on the amount of methanol fed to the esterification system.

In addition to avoiding by-product formation, the alkali metal impregnated esterification catalysts of the present invention exhibit high activity in catalyzing the vapor phase esterification of terephthalic acid with, for example, methanol. Superior results are obtained by using potassium hydroxide impregnated alumina or aluminum phosphate in minimizing isomerization and decarboxylation reactions as well as ether formation. The impregnated catalysts are not corrosive, even at elevated temperatures, and do not contaminate the reactants or reaction products.

Representative results obtained in the vapor phase esterification of terephthalic acid (TPA) with methanol (MeOH) using impregnated catalysts are summarized below in Table I. To form a basis for comparison, Table I also includes results obtained with various unimpregnated catalysts.

TABLE I

| Catalyst Base | Impregnated Salt | MeOH/TPA, Mol Ratio | Product Acid No. | Product DMT, Weight Percent | MeOH Dehydration, Percent |
|---|---|---|---|---|---|
| Alumina A | KOH | 20.0 | 16 | 94.5 | 3.5 |
| Alumina B | KOH | 26.5 | 22 | 92.4 | 3.7 |
| Alumina A | NaOH | 18.7 | 19 | 93.4 | 2.6 |
| Do | Na₂CO₃ | 39.1 | 17 | 94.1 | 6.5 |
| Do | KF | 19.1 | 41 | 85.8 | 4.2 |
| Do | KCl | 22.3 | 25 | 91.4 | 8.0 |
| Do | None | 22.6 | 62 | 78.5 | 40.0 |
| Alumina C | do | 18.8 | 44 | 84.8 | 31.7 |
| AlPO₄ | KOH | 22.8 | 14 | 95.2 | 2.2 |
| AlPO₄ | None | 19.6 | 65 | 77.5 | 21.3 |

In Table I aluminas A, B and C are three separate commercially available activated aluminas.

The percentage yield is a calculated value assuming monomethyl terephthalate as the only acid impurity in the dimethyl terephthalate (DMT) product.

The average contact time of 1.2 seconds employed in the runs reported in Table I refers to the average time the reactants spend in the reactor, i.e., in contact with the catalyst. The superficial vapor velocity was 0.96 ft. per sec. and the reactor temperature was about 650° F. The reaction system was open to the atmosphere and no attempt was made to pressurize any part of the system.

In a particularly suitable embodiment illustrating the process of the present invention, solid terephthalic acid is added to a stream of methanol vapors whereby the solid acid is conveyed by the vaporized methanol, the resulting mixture is heated to a temperature sufficiently high to vaporize the acid and, preferably, thereafter treated, as by filtration, to remove unvaporized solid materials from the vapor mixture of the acid and alcohol, and the thus-purified vapor mixture of the terephthalic acid and methanol is contacted with alkali metal impregnated solid esterification catalyst for from about 0.1 to about 10 seconds and, still more preferably up to about 7 seconds at from a temperature in the range of about 600 to about 760° F. By use of such conditions including the extremely low time of contact of the vaporous mixture of the terephthalic acid and methanol with the esterification catalyst, there has been found to result the highly effective esterification to high yields of the desired dimethylterephthalate of high purity with minimized formation of undesired dimethyl ether thereby minimizing the undesired loss of methanol to ether formation.

The first step in such a preferred embodiment of the process of our invention is the continuous addition in portions of solid terephthalic acid to a stream of excess methanol vapor at a temperature sufficiently high that the addition of the terephthalic acid does not cause any appreciable condensation of the alcohol. The resulting mixture of terephthalic acid and methanol is heated by passage through a furnace or other conventional heat exchange means in order to vaporize completely the terephthalic acid and bring the fully vaporized mixture to a temperature between about 600–760° F. In such a temperature range, the alkali metal impregnated catalysts employed are generally most effective in bringing about a rapid esterification reaction without the decomposition or by-product formation that would result at higher temperatures.

After passing through a filter or other conventional gas-solid separation device to remove non-vaporized solid impurities, the vapor stream is contacted with the impregnated catalyst, as through a bed or body thereof, wherein substantially all of the esterification occurs. The impregnated catalyst material may be employed alone or supported on a suitable non-reactive base material. The catalyst body should be divided in order to promote contact between it and the reactants and may be present either as a fixed or fluidized bed.

After passage through the catalyst, the exiting gas stream is cooled and dimethyl terephthalate is recovered from the reaction mixture. The product is further purified, if necessary, by solvent crystallization, distillation, sublimation, et cetera, as appropriate. The excess methanol employed in the process to promote the esterification reaction may be recovered by any conventional means for reuse in the process.

The process of the invention lends itself to operation in a continuous manner. The cyclic operation of the process of our invention is outlined in the flow sheet which constitutes the drawing. Terephthalic acid both fresh and recycle from the process are fed to a stream of methanol vapor at 600–760° F. This stream may contain an inert diluent gas such as nitrogen or the rare gases. The rates of feed of the acid and the alcohol are adjusted so that a stoichiometric excess of methanol will be present in the reaction mixture as it passes through the reactor. A large excess of alcohol is preferred.

The mixture of terephthalic acid and methanol vapor is heated to 600–760° F. by passage through a furnace, here the one initially used to heat the methanol vapor stream. The resultant mixture of completely sublimed acid and methanol vapor is passed through a filter to remove residual solid material. The filtered vapor stream is passed through a reactor packed with finely divided solid catalyst, the nature of which has been described above. The temperature in the reactor is preferably 650–680° F.

The exit vapors from the reactor are cooled by passage through a series of condensers. As shown in the drawing, the solids are condensed in the first or primary condenser, and the liquids are condensed in the secondary condenser. The condensed solids in the first condenser are slurried with fresh methanol, warmed and filtered. The undissolved solids consisting primarily of unesterified terephthalic acid and monomethyl terephthalate are separated and returned to a feed hopper for recycle to the first step of the process.

Purified dimethyl terephthalate is crystallized from the filtrate of the solid-methanol slurry and separated by filtration. The resultant second methanolic filtrate is combined with the liquid condensate from the secondary condenser and the mixture distilled to separate methanol from the water of esterification which is discarded. The recovered methanol is returned to the process as its vapor after passage through the furnace.

Although not shown, provision is made to bleed the various recycle streams to prevent build-up of trace impurities above acceptable levels.

In an alternate embodiment not explicitly illustrated in the drawing, only one condenser is employed to condense both solids and liquids from the reaction mixture. The procedure using a single knock-out condenser is essentially the same as that described above using primary and secondary condensers. The major difference is that there is no condensate from a secondary condenser to add to the methanol-water filtrate prior to recovery of the methanol.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:

1. A method for preparing diesters of terephthalic acid which comprises contacting a vapor mixture comprising terephthalic acid and an aliphatic alcohol of 1–4 carbon atoms with a particulate solid esterification catalyst containing at least 0.2% alkali metal impregnated therein, and recovering the resultant diester from the reaction mixture.

2. A method according to claim 1 wherein the catalyst contains 0.2–2.0% alkali metal impregnated therein.

3. A method according to claim 1 wherein the catalyst is alumina or aluminum phosphate.

4. A method according to claim 1 wherein the alcohol is an alkanol containing 1 to 4 carbon atoms.

5. A method according to claim 4 wherein the alkanol is methanol.

6. A method for the preparation of dimethyl terephthalate which comprises: adding terephthalic acid to a stream of excess methanol vapor, heating the mixture of terephthalic acid and methanol to a temperature between about 600–760° F. thereby completely vaporizing the acid, passing the resultant vapor mixture through a body of divided solid esterification catalyst containing at least 0.2% alkali metal impregnated therein, and cooling the thus treated vapor mixture to solidify the resultant dimethyl terephthalate.

7. A method according to claim 6 wherein the catalyst contains 0.2–2.0% alkali metal impregnated therein.

8. A method according to claim 6 wherein the catalyst is impregnated by treating with an aqueous solution of an alkali metal base or alkali metal salt.

9. A method according to claim 8 wherein the alkali metal base is potassium hydroxide or sodium hydroxide.

10. A method according to claim 6 wherein the solid esterification catalyst is alumina or aluminum orthophosphate containing 0.2–2.0% alkali metal impregnated therein.

References Cited

UNITED STATES PATENTS 2,806,052    9/1957    Siggel _____ 260—475

LORRAINE A. WEINBERGER, *Primary Examiner.*

T. L. GALLOWAY, *Assistant Examiner.*